ns of Delaware

UNITED STATES PATENT OFFICE 2,451,817

PROCESS FOR REGENERATING SPENT AQUEOUS ALKALINE SOLUTION

Lloyd C. Fetterly, Long Beach, Calif., assignor to Shell Development Company, San Francisco, Calif., a corporation of Delaware No Drawing. Application June 26, 1944, Serial No. 542,258

5 Claims. (Cl. 252—192)

This invention deals with the oxidation of mercaptans in alkaline solution to produce organic disulfides in the presence of organic catalysts soluble in aqueous caustic alkali. More particularly, it is concerned with the protection of said catalysts to prevent or minimize their deterioration by oxidation. A specific application comprises regeneration by air oxidation of aqueous caustic alkali solutions which have been used to extract mercaptans from hydrocarbon distillates.

It is known that mercaptans in aqueous alkali metal hydroxide solutions can be converted to neutral-insoluble disulfides by air oxidation in the presence of certain organic catalysts, thereby producing a regenerated treated solution. These catalysts are of the class which undergo a hydroquinone-quinone type reaction by oxidation and the reverse by reduction. Thus, when the mercaptan content of the alkaline solution becomes low due to progressive oxidation, the catalyst begins to oxidize in excess of the above initial oxidation. Unfortunately, not all of the oxidation products of the catalyst are reducible again to the catalyst when the mercaptan content is increased. Therefore, in the past it has been the practice to retain in the alkaline solution a sufficient amount of mercaptans to protect the catalyst against any oxidation. This, however, resulted in difficulties when it was attempted to utilize the regenerated alkaline solution for further extracting mercaptans from hydrocarbons, because some of these retained mercaptans entered the hydrocarbons producing an unfavorable "re-entry value." (Re-entry value is the amount of mercaptans reintroduced into a mercaptan-free hydrocarbon when contacted with a regenerated treating solution.) Even the most stable and active known catalysts, such as tannin, picramic acid, sulfonated indigo, etc., require protective amounts of mercaptan sulfur of not less than .1% and usually .2% or higher.

Now it has been discovered that mercaptans can be oxidized safely to much lower mercaptan sulfur contents, and even down to zero mercaptan sulfur content, provided a small amount of dissolved inorganic sulfide is maintained in the solution.

Accordingly, it is a purpose of this invention to oxidize mercaptans in alkaline aqueous solution and in the presence of organic catalysts soluble therein, to a lower mercaptan sulfur content than has heretofore been possible, without destruction of the catalyst. It is another purpose to regenerate repeatedly by air oxidation alkaline aqueous solutions used in the extraction of mercaptans from sour hydrocarbon oils to produce regenerated solutions of low re-entry values. Another purpose is to carry out such oxidation in the presence of a protective amount of dissolved inorganic sulfide sulfur, i. e. sulfide ions.

This invention comprises maintaining—during the oxidation of mercaptans in aqueous alkaline solution in the presence of dissolved organic catalyst to form neutral disulfides—an amount of dissolved inorganic sulfide sulfur which is sufficient to prevent or to minimize the oxidation of said catalyst.

As mentioned before, suitable catalysts are capable of undergoing a reversible hydroquinone-quinone-type reaction. By this reaction is meant a reversible oxidation-reduction of a compound wherein two or more hydroxyl, amino and/or primary or secondary radicals are attached either to two vicinal carbon atoms (1,2 positions) linked by a double bond, or two conjugated carbon atoms (1,4 positions) linked by two conjugated double bonds to produce a diketone or diimine respectively, thus:

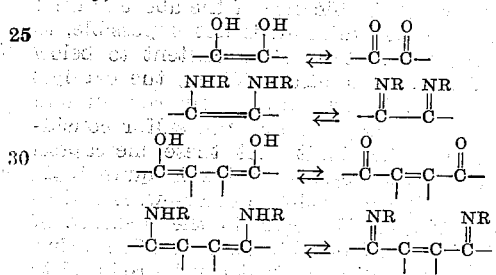

There are several types of compounds known which are capable of undergoing this reversible reaction, notably the ortho and para hydroxy phenols, amino phenols and amino anilines and homologues. Another broad class is that of the water-soluble indigos including thioindigos. As a rule, purely aliphatic compounds are not suitable. R in the above formulae represents an organic radical. The carbon atoms carrying the oxygen or nitrogen (as the case may be) should either be members of an aromatic nucleus or else should form a chain between two aromatic nuclei. Since the catalysts should be soluble in aqueous caustic alkali, the presence of a strong acid radical, such as carboxyl, sulfonic, phosphonic, etc., radical, is desirable although it is not essential. In compounds of the phenol and aniline type the presence of a meta directing radical is also highly desirable in order to stabilize the nucleus and to minimize undesirable side reactions resulting in the destruction of the compound by oxidation reactions other than the hydroquinone-quinone type reaction. Carboxyl, sulfonic, sulfo, sulfonamide, phosphonic, nitro radicals, etc., are all meta directing and may be used to advantage. Below is a list of representative active catalysts:

Ortho or para polyhydroxy polyamino, or amino hydroxy-nitro-benzenes, -benzoic acids, -sulfonyl or phosphonyl benzene, such as pyrogallol, tannic acid and tannin, picramic acid, 2- or 4-amino phenol sulfonic acid-3, 2-amino-4-nitro-alpha naphthol or alpha naphthyl amine; 2- or 6-amino phenol sulfonic acid-3 or -4, etc.; sulfonated indigos such as indigo sulfonate and indigo white sulfonate, or thio indigo sulfonate, etc.

Catalysts are usually employed in concentrations varying from about .05% to 5%, and preferably from about .2% to 2%.

The minimum amount of inorganic sulfide sulfur required to protect the catalyst varies considerably with the nature and concentration of the catalyst, as well as with the amount of residual mercaptan sulfur which is allowed in the solution at the point of completion of the oxidation. The lower the final mercaptin sulfur content, the more sulfide sulfur is required for lasting protection of the catalyst. In the complete absence of mercaptan sulfur, it is desirable to maintain between about .2% and 1% sulfur in the form of dissolved inorganic sulfide, although lesser amounts, say .1%, may give reasonable protection to the catalyst.

The presence of mercaptan sulfur at the end of the oxidation usually allows a proportionally lower minimum sulfide sulfur content. Mercaptans, as a rule, oxidize more readily than inorganic sulfides. Therefore, it is usually possible to reduce the mercaptan sulfur content to very low levels without materially oxidizing the sulfides. However, if the mercaptan sulfur content is reduced to zero, at least a portion of the sulfide content may oxidize as well.

The practical significance of the above is this: heretofore, it was difficult, if not impossible, to reduce the mercaptan sulfur content to below .1% to .2% without also oxidizing the catalyst non-reversibly. Many catalysts require minimum protective amounts of mercaptan sulfur considerably above this limit. At these mercaptan sulfur levels the re-entry value is quite high, usually too high to produce doctor-sweet hydrocarbon distillate. However, in the presence of from .1% to 1% dissolved inorganic sulfide sulfur, the mercaptan sulfur content can be reduced to a lower limit without materially damaging the catalyst, thereby improving the re-entry value of the regenerated solution.

As indicated above, as the mercaptan sulfur content is lowered by oxidation to below about .2%, some of the sulfide may begin to oxidize as well. The oxidation products of the sulfides comprise free sulfur and may include thiosulfates, polythionates and sulfates. Free sulfur, if formed, may be removed by filtration. Thiosulfates, thionates and sulfates, etc., if allowed to build up, reduce the alkalinity of the aqueous treating solution thereby making it less effective for mercaptan extraction, although a small amount of thiosulfates, for example, may be helpful in protecting the catalyst. These salts may also cause difficulty by crystallizing out in the solution. Therefore, it may be desirable to keep the oxidation of the inorganic sulfides at the lowest practical value unless a portion of the solution is continuously withdrawn and replaced with fresh solution, or unless all of the solution is discarded when loaded with neutral salts. By the same token, it may be desirable not to maintain too high a concentration of dissolved sulfide sulfur, although it may be permissible to have it as high as, say, 5%. If the sulfide sulfur content is between the preferred limits indicated earlier and the residual mercaptan sulfur is closely controlled, the rate at which neutral salts will build up can be so slow that their content will never be undesirably high. This is the case particularly if a catalyst is used which is highly selective for the oxidation of mercaptan sulfur as against sulfide sulfur, such as the poly hydroxy or amino hydroxy benzenes having at least one meta directing substitution radical in the nucleus.

Portions of the sulfide sulfur which are oxidized should be replaced to prevent dropping of the sulfide sulfur level to below the minimum protective limit. Replacement may be accomplished in any desired way, as for example by the addition of $H_2S$.

In practice, where the mercaptide solutions are normally obtained in the treatment of sour hydrocarbon distillates, containing $H_2S$ and mercaptans, with aqueous alkaline solutions, $H_2S$ will enter the treating solution unless it has been removed from the distillate. In order to avoid accumulation of excessive quantities of sulfides in the treating solution, it may be desirable to pre-remove a portion of the $H_2S$ from the distillate.

The aqueous caustic alkaline solution may, if desired, contain substantial amounts of solubility promoters for mercaptans such as water-soluble mono or polyhydric alcohols; ethers or esters; alkynolamines or aliphatic diamines; or fatty acids having from about 2 to 6 carbon atoms; naphthenic acids and/or alkyl phenols, etc.

The following examples illustrate the invention:

EXAMPLE I

A spent sodium hydroxide solution obtained in the treatment of hydrocarbon distillates and containing mercaptides and sodium sulfide was oxidized by air blowing in the presence of a .2% tannic acid to zero mercaptan content. Mercaptans were added repeatedly and blowing was continued each time to zero mercaptan sulfur content. The sulfide content was reduced slowly.

| Time for Blowing | Mercaptan Sulfur Added | Sulfide Sulfur | Mercaptan Sulfur |
|---|---|---|---|
| Hours | | | |
|  | | .60 | .77 |
| 2 | | .43 | .00 |
|  | .63 | .43 | .63 |
| 2 | | .42 | .29 |
| 4 | | .27 | .00 |
|  | 1.01 | .27 | 1.01 |
| 4 | | .15 | .00 |
|  | 1.12 | .15 | 1.12 |
| 6 | | .10 | .00 |
|  | 1.20 | .10 | 1.20 |
| 10 | | .04 | 0.00 |

EXAMPLE II

A spent sodium hydroxide solution similar to that of Example I was oxidized by air blowing in the presence of several catalysts. As will be noted, the selectivity for preferentially oxidizing mercaptan sulfur as against sulfide sulfur varied considerably with different catalysts.

Air blowing

| Catalyst | Total Hours | Temperature, °F. | Sulfide Sulfur | Mercaptan Sulfur |
|---|---|---|---|---|
| .2% Quebracho | 2 | 122 | .53 | .32 |
| Do | 3 | 122 | .53 | .08 |
| Do | 4 | 122 | .51 | 0.0 |
| .1% Pyrogallol | 1, 2 | 122 | .48 | .18 |
| Do | 2 | 122 | .40 | 0.0 |
| Do | 2 | 80 | .47 | .29 |
| Do | 3 | 80 | .46 | .16 |
| Do | 4 | 80 | .45 | .07 |
| Do | 5 | 80 | .44 | 0.0 |
| .1% Picramic Acid | 2 | 70 | .54 | 0.0 |
| .1% Indigo Sulfonic Acid | 1 | 80 | .50 | 0.0 |

EXAMPLE III

A spent sodium hydroxide solution similar to that of Example I containing .67% by wt. of NaOH, .1% by wt. of a phenolic catalyst, .60% by wt. sulfide sulfur, and .77% by wt. of mercaptan sulfur was air-blown for 5 hrs. at 80° F. to a zero mercaptan sulfur content and to produce .33% by wt. free sulfur. This blown solution was then respent with light mercaptans to .98% by wt. of mercaptan sulfur. The respent solution after air-blowing for 3 hrs. contained .25% of sulfide sulfur and no mercaptan sulfur. The catalyst was still active.

In comparison, a similar spent caustic solution containing by wt. 2.5% NaOH, .05% phenolic catalyst, 1.25% mercaptan sulfur and no sulfide sulfur was air-blown for 5 hrs. with oxidation of the mercaptan sulfur. The catalyst, however, had lost most of its activity.

I claim as my invention:

1. In a process for regenerating spent aqueous alkaline solution containing mercaptans extracted from hydrocarbons, the improvement comprising treating said spent solution with a free oxygen-containing gas in the presence of a phenolic oxidation catalyst, thereby oxidizing said mercaptans to organic disulfides which catalyst is capable of a reversible oxidation reaction and subject to non-reversible oxidation by oxygen in an alkaline solution in the absence of a protecting reducing agent, and maintaining dissolved in said solution during said oxidation treatment, by extraneous addition, an inorganic sulfide sulfur content of at least 0.1% by weight of sulfide sulfur sufficient to protect said catalyst from non-reversible oxidation.

2. In a process for regenerating spent aqueous alkaline solution containing mercaptans extracted from hydrocarbons, the improvement comprising treating said spent solution with a free oxygen-containing gas in the presence of a phenolic oxidation catalyst, thereby oxidizing said mercaptans to organic disulfides, which catalyst is capable of a reversible oxidation reaction and subject to non-reversible oxidation by oxygen in an alkaline solution in the absence of a protecting reducing agent, and maintaining dissolved in said solution during said oxidation treatment, by extraneous addition, an alkali metal sulfide sulfur content of from about 0.2% to about 1% by weight of sulfide sulfur whereby non-reversible oxidation of said catalyst is minimized.

3. In a process for regenerating spent aqueous alkaline solution containing mercaptans extracted from hydrocarbons, the improvement comprising treating said spent solution with a free oxygen-containing gas in the presence of tannin under oxidizing conditions, thereby oxidizing said mercaptans to organic disulfides, and maintaining dissolved in said solution during said oxidation treatment, by extraneous addition, an inorganic sulfide sulfur content of at least 0.1% by weight of sulfide sulfur sufficient to protect the tannin from non-reversible oxidation.

4. In a process for regenerating spent aqueous alkaline solution containing mercaptans extracted from hydrocarbons, the improvement comprising treating said spent solution with a free oxygen-containing gas in the presence of picramic acid under oxidizing conditions, thereby oxidizing said mercaptans to organic disulfides, and maintaining dissolved in said solution during said oxidation treatment, by extraneous addition, an inorganic sulfide sulfur content of at least 0.1% by weight of sulfide sulfur sufficient to protect the picramic acid from non-reversible oxidation.

5. In a process for regenerating spent aqueous alkaline solution containing mercaptans extracted from hydrocarbons, the improvement comprising treating said spent solution with a free oxygen-containing gas in the presence of pyrogallol under oxidizing conditions, thereby oxidizing said mercaptans to organic disulfides, and maintaining dissolved in said solution during said oxidation treatment, by extraneous addition, an inorganic sulfide sulfur content of at least 0.1% by weight of sulfide sulfur sufficient to protect the pyrogallol from non-reversible oxidation.

LLOYD C. FETTERLY.

REFERENCES CITED

The following references are of record in the file of this patent:

UNITED STATES PATENTS

| Number | Name | Date |
|---|---|---|
| 2,094,485 | Buell | Sept. 28, 1937 |
| 2,315,530 | Loyd | Apr. 6, 1943 |
| 2,316,092 | Loyd | Apr. 6, 1943 |
| 2,369,771 | Bond | Feb. 20, 1945 |
| 2,413,945 | Bolt | Jan. 7, 1947 |
| 2,431,770 | Payne et al. | Dec. 2, 1947 |